United States Patent
Hazenbroek

Patent Number: 5,176,564
Date of Patent: Jan. 5, 1993

[54] MID-WING CUTTER

[76] Inventor: Jacobus E. Hazenbroek, Burg de Zeeuwstraat 52, Numansdorp, Netherlands

[21] Appl. No.: 823,876

[22] Filed: Jan. 22, 1992

[51] Int. Cl.⁵ ............................................. A22C 21/00
[52] U.S. Cl. ..................................... 452/169; 452/167
[58] Field of Search ............... 452/169, 166, 167, 154

[56] References Cited

U.S. PATENT DOCUMENTS

| | | | |
|---|---|---|---|
| 4,016,624 | 4/1977 | Martin et al. | 17/11 |
| 4,207,653 | 6/1980 | Gasbarro | 17/11 |
| 4,562,613 | 1/1986 | Lewis | 452/169 |
| 4,577,368 | 3/1986 | Hazenbroek | 17/11 |
| 4,597,136 | 7/1986 | Hazenbroek | 452/169 |
| 4,769,872 | 9/1988 | Hazenbroek et al. | 17/52 |
| 4,920,610 | 5/1990 | Callsen et al. | 452/169 |
| 4,935,990 | 6/1990 | Linnenbank | 452/169 |
| 4,993,115 | 2/1991 | Hazenbroek | 452/169 |

Primary Examiner—Willis Little
Attorney, Agent, or Firm—Hopkins & Thomas

[57] ABSTRACT

A poultry wing tip processing apparatus (9) wherein the mid-wing segments are severed from the drumette segments of the wings of poultry carcasses, or other similar fowl. The carcasses are conveyed in an inverted attitude suspended by their legs from shackles as their torsos move between a pair of guide rods (44) and guide rails (56) prior to reaching a pair of rotary disc cutters (34). A ramp (66) is positioned to engage the shoulder portions of the carcasses and a second pair of guide rods (71) engage the mid-wing segments of the carcasses. The elbow joints between the drumette segments and the mid-wing segments move toward and through the rotary disc cutters (34) as a pair of elbow joints engaging means (40) engage the elbow joints and guide them through the disc cutters (34), wherein the mid-wing segments are severed from the drumette segments.

19 Claims, 3 Drawing Sheets

MID-WING CUTTER

FIELD OF THE INVENTION

The present invention relates to a method and apparatus for processing previously eviscerated poultry carcasses and, more particularly, to a method and apparatus for severing the mid-wing sections from the drumette sections of the wings of the carcasses as a plurality of the carcasses move in series, suspended by their legs, along a poultry processing line.

BACKGROUND OF THE INVENTION

In the processing of poultry carcasses in the past, removing the wings from the carcasses at the carcass shoulder joints and cutting the wings at the joints between the drumette, mid-wing, and wing tip sections to produce separate poultry wing segments was a labor intensive operation. Typically, the wings were manually removed from the carcass and after removal were manually cut into segments. With the growing consumer demand for segmented chicken wings, it became desirable to automate the processing of poultry wings.

Automation of the poultry wing cut up process was accomplished to some extent by the cutting and separating of the whole wings from the carcasses while the poultry carcasses were suspended from the main overhead conveyor system of a poultry processing plant, an example of which is disclosed in U.S. Pat. No. 4,597,136 of Hazenbroek. After the whole wings were removed, they were manually placed in a wing dissector such as disclosed in U.S. Pat. No. 4,207,653 of Gasbarro and in U.S. Pat. No. 4,577,368 of Hazenbroek, which divides or separates each of the wings into its three segments. However, this procedure requires the manual steps of placing each wing in the wing dissector. Other wing cut up procedures are suggested by U.S. Pat. No. 4,016,624 of Martin and U.S. Pat. No. 4,769,872 of Hazenbroek; however, in these devices the poultry carcass must be manually mounted on the cut up machine. Such a transfer operation is time consuming, labor intensive, and increases the risk of operator injury.

Thus, a need exists in the art for a method and apparatus for accurately severing the mid-wing segments from the drumette segments of the wings of poultry carcasses while the carcasses are being conveyed by an overhead conveyor system.

SUMMARY OF THE INVENTION

Briefly described, the present invention comprises a poultry wing processing apparatus in a continuous, automated poultry processing line wherein, after the wing tips have been removed, the mid-wing segments of poultry carcasses are severed from the drumette segments. The carcasses are moved to the mid-wing cutter suspended in an inverted attitude from an overhead conveyor and both wings are operated on simultaneously on opposite sides of the conveying path as the suspended carcasses are conveyed through the mid-wing cutter with the breast portions of the carcasses facing forwardly in the direction of movement of the carcasses.

The mid-wing cutter apparatus includes two cutting assemblies, each positioned along the processing path on an opposite side thereof and each operating on one wing of a carcass as the carcass moves between the cutting assemblies. Each cutting assembly includes a rotary disc cutter positioned parallel to and spaced from the path of movement of the carcasses. As a carcass moves through the mid-wing cutter apparatus, the elbow joint between the drumette segment and the mid-wing segment of each wing contacts the top peripheral edge of the rotary disc cutter of each cutting assembly. Elbow joint engaging means are provided at each rotary disc cutter for engaging the elbow joint at this point and guiding the elbow joint down upon the rotary disc cutter, facilitating complete cutting of the elbow joints, and thus, severance of the mid-wing segments from the drumette segments.

The elbow joint engaging means comprises an inverted U-shaped plate member adjacent each rotary disc cutter that has a slot through which the top peripheral edge of the adjacent rotary disc cutter moves. The inverted U-shaped plate member straddles the top peripheral edge of the rotary disc cutter and angles downwardly in the direction of movement of the carcasses. The peripheral edge of the rotary disc cutter has a cutting edge sufficiently dull in order not to sever the tissue of the elbow joint, but rather to guide the joint towards the inverted U-shaped plate member. The peripheral edge has peripheral notches therein that are sufficiently sharp for severing the tissue of the elbow joint. Therefore, when an elbow joint engages the upper peripheral edge of a rotary disc cutter, the peripheral edge guides the joint above the disc cutter into engagement with the inverted U-shaped plate member, whereby the angled position of the plate member forces the elbow joint down upon the disc cutter as the notches in the peripheral edge thereof sever the joint.

The mid-wing cutter apparatus includes torso guide rods for engaging the torsos of the conveyed carcasses and reducing any lateral swaying movement of the carcasses. Ramp engaging means are also provided for engaging the shoulder portions of the carcasses for tilting the carcasses rearwardly in order to raise the shoulder joints between the drumette segments and the mid-wing segments to an approximate predetermined height with respect to the rotary disc cutters of each cutting assembly. In addition, guide rod means are provided for guiding the mid-wing segments of the wings laterally outwardly from the carcasses so that, as the wings approach the rotary disc cutters, the mid-wing segments and drumette segments of each wing straddle each rotary disc cutter. Guide rail means for guiding the wings and pivoting them downwardly and rearwardly as the carcass approaches the rotary disc cutters are also provided, which action aligns the wings perpendicularly to the disc cutters.

Accordingly, it is an object of the present invention to remove expediently and reliably the mid-wing segments from the drumette segments of poultry wings with a minimum of operator intrusion in a continuous automated poultry processing line in which poultry carcasses are moved in series while suspended by their legs.

Another object of the present invention to reduce the manual handling of poultry carcasses as the wing segments of the carcasses are removed in an automated poultry processing system.

Yet another object of the present invention is to provide a means for segmenting poultry wings that is relatively simple in design, inexpensive to produce, easy to install, efficient to operate, and which reliably functions to remove the mid-wing segments from the drumette segments of poultry wings.

Still another object of the present invention is to increase the rate of poultry carcass processing as compared to prior art machines.

Other objects, features, and advantages of the present invention will become apparent from the following specification, when read in conjunction with the accompanying drawings.

DETAILED DESCRIPTION

Figure 1:
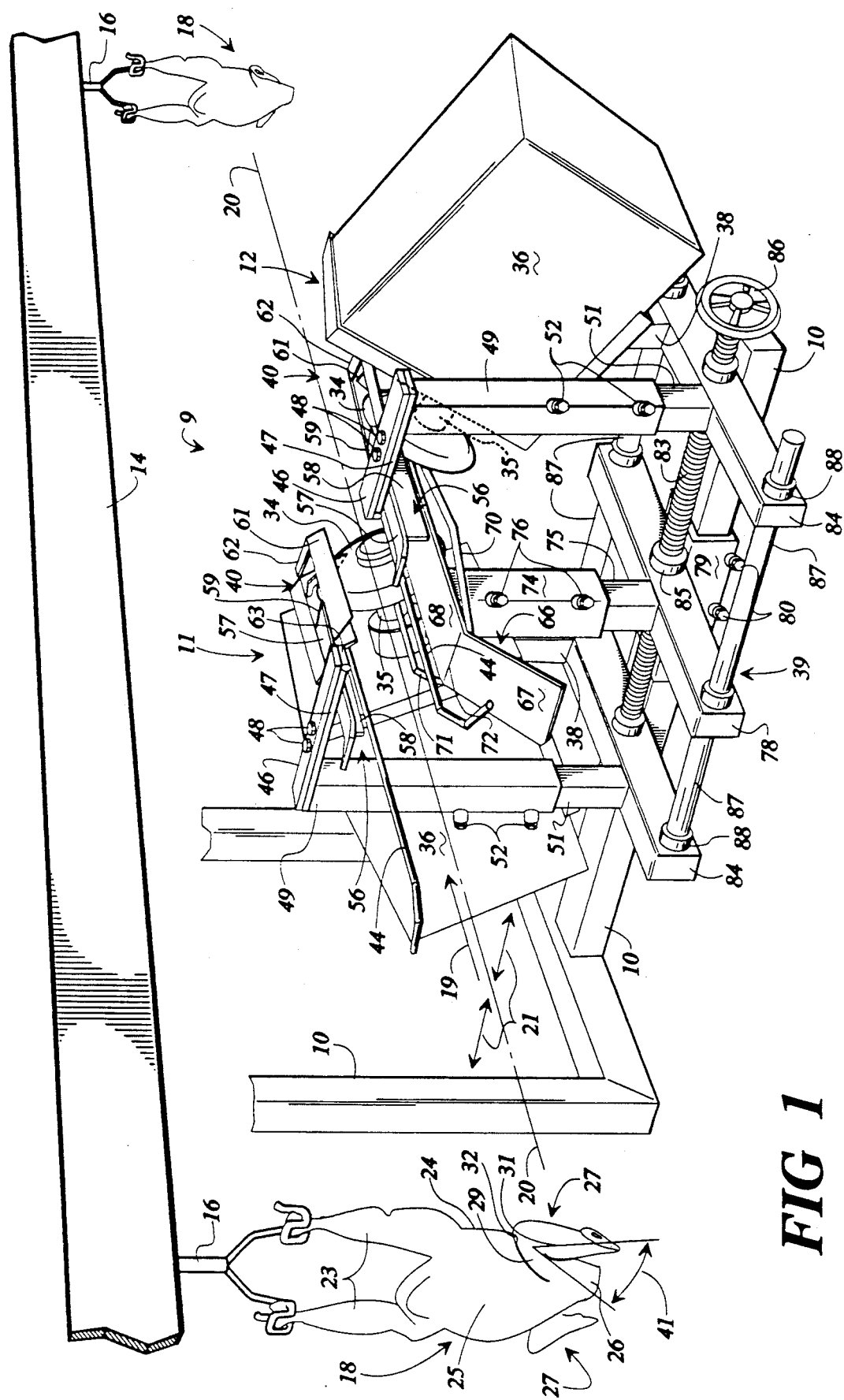
FIG. 1 is a perspective view of the mid-wing cutter apparatus of the present invention shown positioned beneath an overhead conveyor system.

Referring now to the drawings, in which like numerals represent like parts throughout the several views, FIG. 1 illustrates a mid-wing cutter apparatus 9 that embodies principles and features of the present invention. The apparatus 9 includes a frame 10, which supports two mid-wing cutting assemblies, indicated generally at 11 and 12, positioned beneath an overhead conveyor 14 from which depend a plurality of regularly spaced shackles 16, from which hang the poultry carcasses 18. Throughout the ensuing description, reference will be made to rearwardly and forwardly directions and upstream and downstream directions, based upon the direction of movement of carcasses 18 through the apparatus 9, as indicated by the arrow 19, to the processing path along which the carcasses 18 are conveyed, as indicated by the dashed line 20, and to inwardly and outwardly directions, based upon lateral movements or positions towards and away from the processing path 20, as indicated by arrows 21. In addition, reference will be made to the various parts of the bird carcasses, specifically, the legs 23, the breast portions 24, the torso 25, the shoulder portion 26, the wings 27, which include a drumette 29, a mid-wing section 31, and a joint 32 between the drumette 29 and mid-wing section 31, which shall be referred to as the elbow joint, and the shoulder joints 28 between the wings 27 and the carcass 18.

The mid-wing cutter apparatus 9 is positioned along a processing line and beneath a conventional overhead conveyor 14 at a point along the line reached by the conveyed carcasses 18 after the birds have been killed, defeathered, and eviscerated and after the wing tip segments have been severed from the mid-wing segments 31 at a preceding station. The apparatus is designed to sever the mid-wing segments 31 from the poultry carcasses 18, which are suspended in an inverted attitude by their legs 23 from the shackles 16, with their breast portions 24 facing forwardly in the direction of movement 19.

The mid-wing cutting assemblies 11 and 12 are positioned along the processing path 20, each on the opposite side thereof, and function as a means for cutting the mid-wing segments 31 from the wings 27 as the carcasses are conveyed between the assemblies 11 and 12. Assemblies 11 and 12, which are essentially mirror images of each other, each comprises a rotary disc cutter 34 mounted on a blade drive shaft 35, which is coupled to a drive means (not shown) within a motor enclosure housing 36. The mid-wing cutting assemblies 11 and 12 are mounted on support beams 38, which are mounted on an adjustment means, indicated generally at 39 and discussed hereinafter.

Elbow joint engaging means 40, 40 are positioned along the processing path 20 on opposite sides thereof, each positioned adjacent the top peripheral edge of a rotary disc cutter 34. The elbow joint engaging means 40, 40 are positioned to engage the elbow joints 32 as the joints move over the top peripheral edges of the rotary disc cutters 34, 34 and guide the elbow joints 32 downwardly through or towards the disc cutters 34, 34 as more clearly shown in FIG. 2 and discussed hereinafter.

An upper guide rod 44 is mounted along each opposite side of the processing path 20 and functions as a means for vertically aligning the carcasses 18. Guide rods 44, 44 are mounted to support bars 46, 46 which secure the guide rods 44, 44 in a position parallel to the processing path 20 and spaced therefrom and from each other. The guide rods 44, 44 converge towards the processing path 20 for an initial or upstream portion of their length in order to gather the carcasses 18 towards the apparatus 9 as the carcasses 18 move along the processing path 20, and, thus, they reduce any lateral swaying movement in the carcasses 18. Support bars 46, 46 are removably mounted to support plates 47, 47 as by bolts 48, 48. Support plates 47, 47 are welded at their ends opposite guide rods 44, 44 to vertical sleeve members 49, 49 which are slidable on support beams 51, 51 by set screws 52, 52. Support beams 51, 51 in turn, are mounted on the adjustment means 39. Bolts 48, 48 allow the guide rods 44, 44 to be removed from the apparatus 9 for cleaning purposes.

Figure 2:
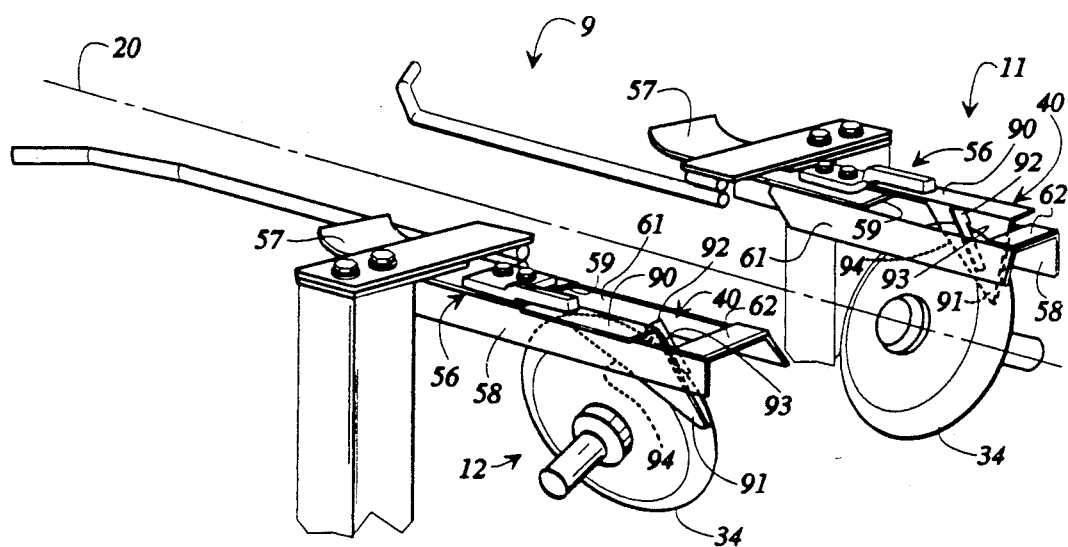
FIG. 2 is a perspective view of a portion of the mid-wing cutter apparatus shown in FIG. 1 as seen from a position downstream from the apparatus illustrating the elbow joint engaging means.

L-shaped guide rails 56, 56 function as wing guide means for engaging the wings 27 and pivoting them downwardly and rearwardly. Each guide rail 56 is mounted along an opposite side of the processing path 20 adjacent the upper guide rod 44 and parallel thereto. The L-shaped guide rails 56, 56 each comprise a top guide rail 57 and a side guide rail 58, with the side guide rail 58 extending along the processing path 20 past a rotary disc cutter 34 and the top guide rail 57 terminating upstream of a rotary disc cutter 34 at 59, as best seen in FIG. 2 and as will be discussed with reference thereto. L-shaped guide rails 56, 56 are welded to support bars 46, 46 and support plates 47, 47 and thus, may also be removed for cleaning purposes. The positioning of the guide rails 56, 56 allows them to engage the wings 27 and rotate them rearwardly and downwardly and thus, align the wings 27 generally perpendicular to the rotary disc cutters 34, 34. Set screws 52, 52 on sleeve members 49, 49 provide a means for adjusting the position of the guide rods 44, 44 and the guide rails 56, 56 with respect to the rotary disc cutters 34, thus allowing the apparatus 9 to be adjusted to process birds having wings of varying sizes.

First and second drumette engaging guide plates 61, 61 are mounted along opposite sides of the processing path 20 parallel thereto with their leading upstream ends 63 (only one shown) mounted to the inner edges of the top guide rails 57, 57 of L-shaped guide rails 56, 56, and their trailing downstream ends secured to the side guide rails 58,58 of L-shaped guide rails 56, 56 by fastener members 62, 62. These drumette engaging guide plates 61, 61 are positioned laterally inward from the rotary disc cutters 34, 34 and are oriented at an angle downwardly and inwardly toward the processing path 20, which positioning allows them to engage and stabilize the drumettes 29 as the elbow joints 32 move over and through the top peripheral edges of the rotary disc cutters 34, 34 as more fully discussed hereinafter.

Shoulder portion engaging means 66 for engaging the shoulder portions 26 of the carcasses 18 in order to tilt the carcasses 18 rearwardly and raise the shoulder joints 28 are mounted beneath the processing path 20 parallel therewith and include an inclined ramp surface 67 and a horizontal surface 68. The inclined ramp surface 67 is positioned to engage the shoulder portion 26 of the carcasses 18, tilting the carcasses rearwardly away from their direction of movement 19 and raising the shoulder joints 28 of the carcasses 18 to an approximate predetermined height with respect to the rotary disc cutters. This height is a function of the size of the carcasses and, more particularly, the distance between the shoulder joints 28 and the front breast portions 24 of the carcass 18.

Mid-wing segment guide means 70,70 for engaging the mid-wing segments 31 and extending the drumette segments 29 and mid-wing segments 31 laterally outwardly from the carcasses 18 are mounted adjacent the shoulder engaging means 66. Guide means 70, 70 comprise first and second lower guide rods 71, 71 mounted along opposite sides of the processing path 20 and extending from beneath the leading edge 72 of the horizontal surface 68 of shoulder portion engaging means 66 laterally outwardly towards the leading edges of the rotary disc cutters 34, 34. The purpose of the lower guide rods 71, 71 is to engage the inner sides of the mid-wing segments 31 in order to guide them to the outward sides of the rotary disc cutters 34, 34 so that the wings 27 straddle the cutters as they move past them. The horizontal surface 68 of the shoulder portion engaging means 66 is mounted on top of a hollow sleeve member 74, which is slidable with respect to a support beam 75 and secured thereto by set screws 76. This arrangement allows the shoulder portion engaging means 66 and the mid-wing segment guide means 70, 70 to be adjusted to accommodate carcasses of varying sizes. Support beam 75 is mounted on the adjustment means 39. The aforementioned guide rods 44,44 and 71,71, wing engaging L-shaped guide rails 56,56, drumette engaging guide plates 61,61, elbow joint engaging means 40,40, and shoulder portion engaging means 66 function to direct the elbow joints 32 toward and past the rotary disc cutters 34,34 properly oriented for the cutters to make clean cuts through the connecting tissue between the bones of the wings 27 at elbow joint 32.

The adjustment means 39 functions to adjust the position of the rotary disc cutters 34 with respect to the processing path 20, thus allowing the apparatus 9 to process carcasses 18 having wing spans of varying sizes. Adjustment means 39 comprises an adjustment screw 83, which extends through a main base support bar 78 and two travelling bars 84, 84 and is rotatably supported within a retainer ring 85 by the main base support bar 78. The adjustment screw 83 is adapted for threaded engagement with the travelling bars 84, with the threads on one side of the main base support bar 78 being reverse threads. A hand wheel 86 is mounted to one end of the adjustment screw 83, the turning of which causes the travelling bars 84 to move towards or away from the main base support bar 78, thus causing the mid-wing cutter assemblies 11 and 12 to move laterally with respect to the processing path 20. Support shafts 87 extend through the ends of the main base support bar 78 and through bushings 88 at the ends of the traveling bars 84, thereby supporting the mid-wing cutter assemblies 11 and 12 while allowing them to be adjusted towards and away from the processing path 20. The traveling bars 84 support beams 38, which support the cutter assemblies 11 and 12, and support beams 51, which support guide rails 56 and elbow joint engaging means 40, 40. The main base support bar 78 supports ramp support beam 75 and is mounted atop a horizontal sleeve member 79, which is slidable with respect to frame 10 and is secured thereto by set screws 80.

FIG. 2 illustrates the mid-wing cutter apparatus 9 including the mid-wing cutting assemblies 11 and 12 and shows more clearly the details of the elbow joint engaging means 40, 40, the L-shaped guide rails 56, 56 of the wing guide means 56, 56, and the drumette engaging guide plates 61, 61. Each elbow joint engaging means 40 comprises a horizontal portion 90, an angular tapered portion 91 having a mid-wing engaging leading edge 94, and an L-shaped drumette engaging plate member 92. The elbow joint engaging means 40, 40 are each secured to a top guide rail 7 of an L-shaped guide rail 56 at one end of the horizontal portions 90. The angular tapered portion 91 and the L-shaped plate member 92 of each elbow joint engaging means 40 form an inverted U-shaped plate member having a slot 93 through which the peripheral edge of a rotary disc cutter 34 moves. Each drumette engaging plate member 92 is angled downwardly in the direction of movement of the carcasses parallel with the mid-wing engaging leading edge 94 of the angular tapered portion 91. This arrangement causes the L-shaped plate members 92, 92 to engage and apply pressure on the drumette side of the elbow joints 32 as the wings move through the disc cutters 34, 34, while the tapered edges 94, 94 of the angular tapered portions 91, 91 engage and apply pressure on the mid-wing side of the elbow joints 32. Thus, it can be seen that the elbow joint engaging means 40, 40 function as a means for engaging the elbow joints 32 and guiding them toward the rotary disc cutters 34, 34.

FIG. 2 also shows the top guide rail termination point 59 along the processing path 20 where the top guide rails 57, 57 of the wing engaging L-shaped guide rails 56, 56 terminate, whereas the side guide rails 58, 58 extend past the rotary disc cutters 34, 34. Also shown in FIG. 2 are the drumette engaging guide plates 61, 61, which extend from the top guide rails 57, 57 past the rotary disc cutters 34, 34 to a point along the processing path 20 coincident with the trailing edge of the side guide rails 58, 58.

Figure 3:
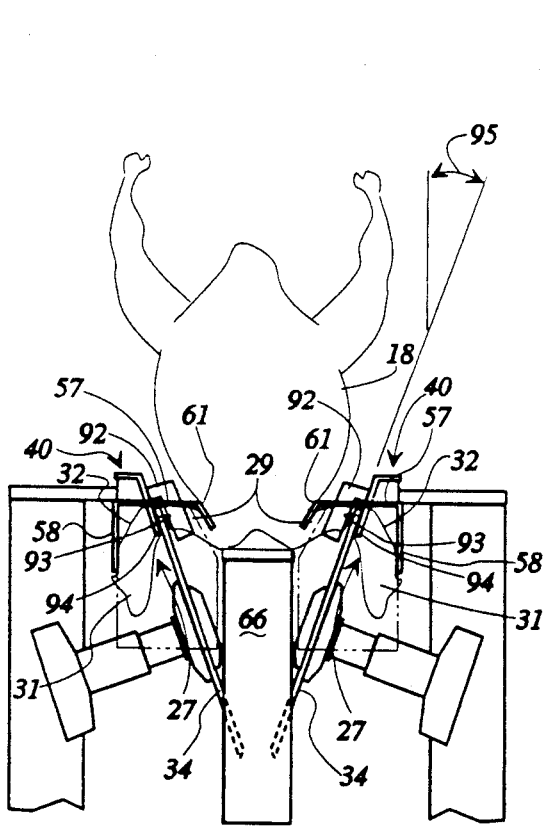
FIGS. 3 is a detail front elevational view of the apparatus illustrating the rotary disc cutters, the wing engaging means, and the elbow joint engaging means and their relationship with the wings of the carcasses prior to the mid-wing segments being severed.

FIG. 3 best illustrates the slots 93, 93 formed by the angular tapered portions 91, 91 and the L-shaped drumette engaging plate members 92, 92 of each elbow joint engaging means 40. The rotary disc cutters 34, 34 extend up into these slots 93, 93, which receive the wings 27 of the carcasses 18 immediately after the wings 27 engage the top peripheral edges of the rotary disc cutters 34, 34. The rotary disc cutters 34, 34 are positioned at an angle 95 with respect to the general vertical attitude of the carcasses 18, which angle is approximately twenty degrees.

FIG. 3 also shows the L-shaped configuration of each wing engaging L-shaped guide rails 56. As the wings 27 move underneath the guide rails 56, 56, the top guide rails 57, 57 engage the drumette segments 29 while the side guide rails 58, 58 engage the mid-wing segments 31. This engagement causes the wings 27 to pivot downwardly and rearwardly, which tends to align the wings generally perpendicular to the rotary disc cutters 34, 34. Also shown in FIG. 3 are drumette engaging guide plates 61, 61 which angle downwardly and inwardly and are positioned to engage the drumettes 29 as the wings 27 move past the rotary disc cutters 34, 34. It should be noted that when the wings 27 reach the rotary disc cutters 34, 34, the top guide rails 57, 57 have terminated and no longer engage the drumettes 29. Thus, at this point the guide plates 61, 61 and the side guide rails 58, 58 engage the wings 27 while the elbow joint engaging means 40, 40 engage the elbow joints 32 as the wings 27 move past the rotary disc cutters 34, 34.

Figure 4A:
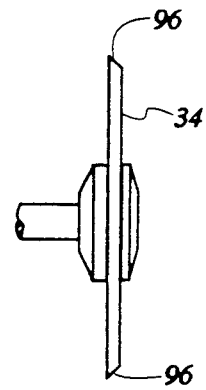
FIGS. 4A and 4B are a side elevational view and a front elevational view, respectively, of one of the rotary disc cutters.
Figure 4B:
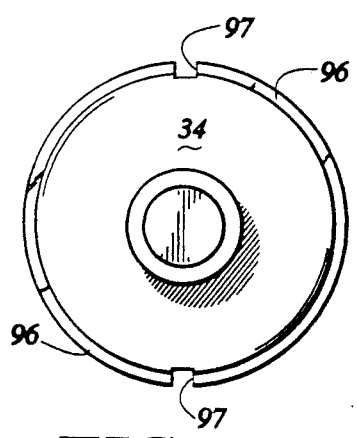
Figure 5:
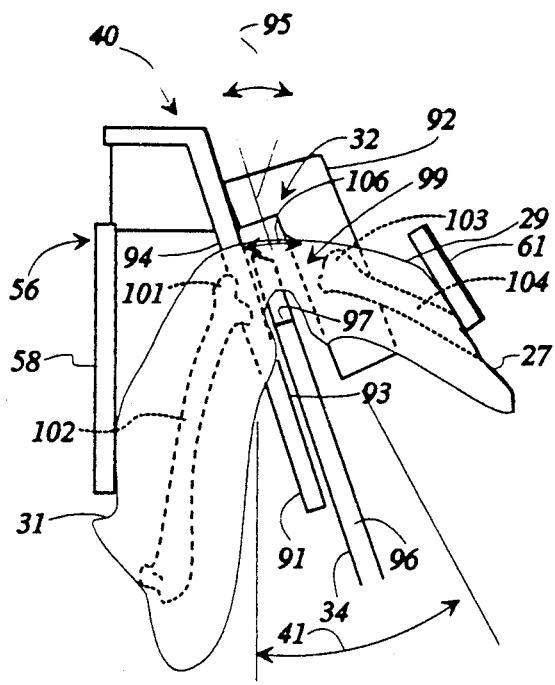
FIG. 5 is a schematic view of the drumette segment and mid-wing segment as one of the rotary disc cutters engages the elbow joint.

Each rotary disc cutter 34, 34 as shown in FIGS. 4A and 4B, has an angled peripheral edge 96, which is relatively dull compared to conventional blades used in poultry processing operations. These edges 96 guide the elbow joints 32 toward the elbow joint engaging means 40, 40. As shown in FIG. 5, as a wing 27 engages a rotary disc cutter 34, the relatively dull edge 96 of the cutting blade 34 seeks the connecting tissue 99 between the elbow joint end 101 of the mid-wing bone 102 and the proximal end 103 of the drumette bone 104 within the wing 27, while the notches 97 of the disc cutter 34 actually sever the connecting tissue 99. While the rotary disc cutter 34 engages the elbow joint 32 from beneath the joint, the mid-wing engaging leading edge 94 of the angular tapered portion 91 of the inverted U-shaped configuration of elbow joint engaging means 40 engages, from above the joint 32, the mid-wing side of the elbow joint 32 while the L-shaped plate member 92 engages the drumette side of the elbow joint 32. This counter-pressing action on the elbow joint 32 forces the elbow joint 32 towards and down through the rotary disc cutter 34, causing the tissue 99 around the joint to wrap around the peripheral edge 96 of the disc cutter 34 while the notches 97 sever the connecting tissue 99. As the elbow joint 32 is being severed, the side guide rail 58 of the wing engaging L-shaped guide rail 56 remains in contact with the mid-wing segment 31, while the drumette engaging guide plate 61 remains in contact with the drumette 29. This braces the wing 27 and prevents it from expanding, thus helping to keep the mid-wing segment partially folded with respect to the drumette 29 and, therefore, helping to maintain the acute angle 41 between the mid-wing segment 31 and the drumette 29.

As an elbow joint 32 is forced through a rotary disc cutter 34, the top exterior side of the elbow joint 32 tends to stretch, as indicated by arrow 106, thus making it easier for the rotary disc cutter 34 to cut through the connecting tissue 99, rather than the elbow joint end 101 of the mid-wing bone 102 or the proximal end 103 of the drumette bone 104, which reduces the potential for bone fragments. Furthermore, the angle 95 at which the rotary disc cutter 34 is positioned aligns the disc cutter 34 within the angle 41, causing the disc cutter 34 to be directed toward the connecting tissue 99 between the bones 102 and 104 of the elbow joint 32, which also reduces the potential for bone fragments.

The construction of the parts discussed heretofore can be of any of a number of materials having suitable strength and durability for the required purposes and which also comply with government food handling regulations. Preferably, all parts are made of stainless steel, except for the following parts: handwheel 90 may be made of aluminum, adjustment screw 88 and retainer ring 89 may be made of brass, and bushings 92 may be made of bronze.

OPERATION

Figure 6A:
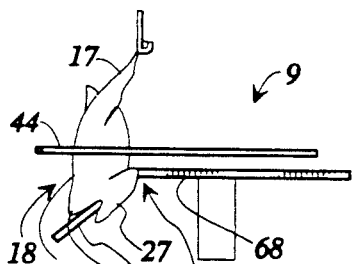
FIG. 6A–6C, and 6F are schematic side views of the carcass as it moves through the mid-wing cutter apparatus.
Figure 6B:
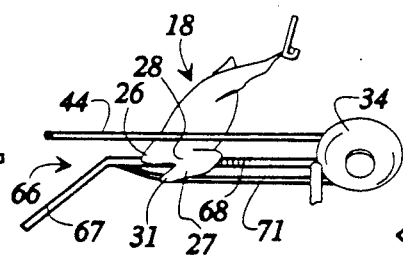
Figure 6C:
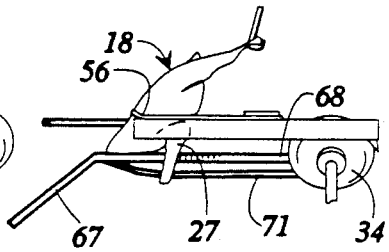

The processing steps, as illustrated in FIG. 6A through 6F, start with a previously eviscerated carcass 18 being conveyed suspended by its legs 23 in an inverted attitude from a shackle 16 towards the cutter apparatus 9, as shown in FIG. 6A. The torso 25 of the carcass 18 engages the upper guide rods 44 (only one shown), which gather the carcass 18 toward the apparatus 9 and align it vertically. After the carcass 18 is vertically aligned, the shoulder portion 26 engages the inclined surface 67 of the shoulder portion engagement means 66, which causes the carcass 18 to tilt rearwardly, thus, raising the shoulder joints 28 between the wings 27 and the carcass 18 substantially to an approximate predetermined height with respect to the rotary disc cutters 34. When the shoulder portion 26 reaches the top of the inclined surface 67, the insides of the mid-wing segments 31 engage the lower guide rods 71, which guide the mid-wing segments 31 to the outward sides of the rotary disc cutters 34. Next, the elbow joints 32 engage the L-shaped guide rails 56, as shown in FIG. 3C, which thereby cause the wings 27 to pivot downwardly and to open or pivot rearwardly.

Figure 6D:
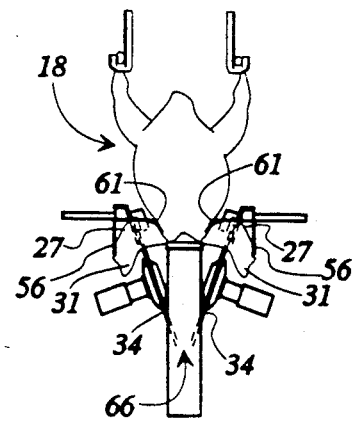
FIGS. 6D and 6E are schematic front views of the mid-wing cutter apparatus as the carcass approaches and moves past the rotary disc cutters.

As the carcass 18 is conveyed along guided by guide rails 56 and ramp 66, the wings approach the rotary disc cutters 34, 34 with the drumettes 29 and the mid-wing segments 31 extended from the carcasses 18, as shown in FIG. 6D. Just prior to reaching the disc cutters 34, 34, the drumette engaging guide plates 61, 61 engage the drumettes 29, while top guide rails 57, 57 of guide rails 56, 56 terminate, leaving the side guide rails 58, 58 of the L-shaped guide rails 56, 56 to guide the mid-wing segments 31 to the rotary disc cutters 34, 34.

Figure 6E:
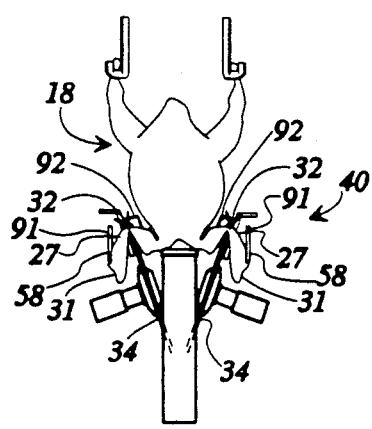
Figure 6F:
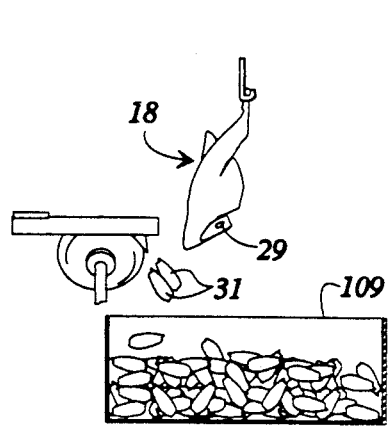

As the elbow joints 32 approach the rotary disc cutters 34, 34 as shown in FIG. 6E, the angular tapered portions 91, 91 and the L-shaped drumette engaging plate members 92, 92 of the elbow joint engaging means 40, 40 guide the elbow joints 32 through the rotary disc cutters 34, 34. As shown in FIG. 6F, after the mid-segments 31 have been severed from the drumette 29, the mid-wing segment 31 fall into a collection bin 109, or other suitable collection means.

The apparatus 9 is adaptable to process many different types of birds, such as chickens, pheasants, geese, ducks and similar fowls and to do so in a relatively quick, efficient manner. The mid-wing segments are automatically severed from the drumettes as the carcasses move through a processing line suspended by their legs from shackles of an overhead conveyor system. The elimination of the requirement of dismounting the carcasses and manually remounting them onto a separate conveyor significantly increase the processing rate and reduces labor costs.

The foregoing method and apparatus for severing the mid-wing segments from the drumettes of the wings of poultry carcasses, as described in the specification and illustrated in the drawings in a preferred embodiment of the present invention. However, it will be understood by those skilled in the art that the principles and features discussed herein are adaptable to the separating of the distal segments from the limbs of other animals, and that numerous changes and modifications may be made to the present invention for this purpose without departure from the spirit and scope of the invention.

I claim:

1. An apparatus for severing the mid-wing segment from the drumette segment of the wing of a bird carcass as the carcass is conveyed in a direction along a processing path and suspended from a conveyor line, the wing including a mid-wing bone having a first end, a drumette bone having a proximal end, and connecting tissue between the first and proximal ends, which together form an elbow joint of the wing, the apparatus comprising:

support means for positioning the apparatus beneath the conveyor line;

a rotary disc cutter supported on said support means in the path of the elbow joint for cutting upwardly through the elbow joint between the drumette segment and the mid-wing segment of the wing, as the wing moves over the rotary disc cutter;

the peripheral edge of said rotary disc cutter having sequential dull edges for aligning the elbow joint on the disc cutter and sharpened areas for severing through the elbow joint;

guide means for directing the elbow joints into engagement with the cutting means so that a cut is made through the connecting tissue between the first end of each mid-wing bone and the proximal end of each drumette bone, elbow joint engaging means for engaging the elbow joint positioned above the peripheral edge of the rotary disc cutter for urging the elbow joint downwardly against the peripheral edge of said rotary disc cutter, said elbow joint engaging means forming a slot through which the peripheral edge of the rotary disc cuter is adapted to move, so that as the elbow joint of the wing moves over and engages the peripheral edge of the rotary disc cutter, the elbow joint is guided into engagement with the elbow joint engaging means and is pressed downwardly by said elbow joint engaging means toward the rotary disc cutter, until a cut is made through the connecting tissue between the first end of the mid-wing bone and the proximal end of the drumette bone.

2. The apparatus of claim 1 and wherein said guide means comprises a shoulder portion engaging means for tilting the carcass away from its direction of movement in order to raise the joint between the wing and the carcass substantially to an approximate predetermined height with respect to the rotary disc cutter.

3. The apparatus of claim 2 and wherein said shoulder portion engaging means comprises an inclined ramp surface and a surface substantially parallel to the processing path, the substantially parallel surface being positioned vertically in sufficient proximity of the conveyor line to cause the carcass suspended therefrom to tilt away from its direction of movement, thereby raising the joint between the wing and the carcass.

4. The apparatus of claim 1 and wherein said guide means comprises a mid-wing segment guide means for engaging the mid-wing segment and extending it laterally outwardly away from the carcass to the outward side of the rotary disc cutter.

5. The apparatus of claim 4 and wherein said mid-wing segment guide means comprises a lower guide rod spaced outwardly from the processing path.

6. The apparatus of claim 2 and wherein said guide means further comprises wing guide means for engaging the wing and pivoting it downwardly and rearwardly away from the direction of movement of the carcass.

7. The apparatus of claim 6 and wherein said wing guide means comprises an L-shaped guide rail spaced outwardly from and parallel to the processing path, the L-shaped guide rail including a horizontal member and a vertical member depending from the outward edge of the horizontal member, and the L-shaped member being positioned vertically in sufficient proximity to the shoulder portion engaging means to pivot the wing downwardly and rearwardly away from the direction of movement of the carcass.

8. The apparatus of claim 1 and wherein said guide means comprises a drumette engaging guide plate spaced outwardly from the processing path for engaging the inward side of the drumette segment as the elbow joint is severed.

9. The apparatus of claim 1 and wherein said guide means comprises torso engaging guide means for engaging the torso of the carcass in order to reduce any lateral swaying movement of the carcass.

10. The apparatus of claim 9 and wherein said torso engaging guide means comprises an upper pair of guide rods spaced outwardly from the processing path on each side thereof.

11. The apparatus of claim 1 and further comprising means for adjusting the guide means with respect to said mid-wing cutting means in order to sever the mid-wing segment of carcasses of varying sizes.

12. The apparats of claim 1 and further comprising means for adjusting the mid-wing cutting means in order to sever the mid-wing segment of carcasses of varying sizes.

13. A method of severing the mid-wing segment from the drumette segment of a poultry carcass as the carcass is moved in series along a poultry processing line suspended by its legs, comprising the steps of:

elevating the torso of the carcass to position its shoulder joint at an approximate height;

while the torso is elevated:

spreading the drumette segment from the torso in generally a laterally extended attitude and pivoting the drumette segment downwardly and rearwardly while maintaining the mid-wing segment partially folded with respect to the drumette segment and generally in a vertically extended attitude; and moving the partially folded joint between the drumette segment and the mid-wing segment of the wing over the cutting edge of a disc cutter to sever the mid-wing segment from the drumette segment.

14. The method of claim 13 and wherein the step of moving the partially folded joint over the disc cutter comprises moving the joint into an inverted U-shaped guide and pressing the joint with the inverted U-shaped guide downwardly into the cutting edge of the disc cutter until the mid-wing segment is severed from the drumette segment.

15. A method of severing the mid-wing segments from the drumette segments of the wings of poultry carcasses as the carcasses are conveyed in series in a direction along a processing path and suspended invertedly by their legs from a conveyor line comprising the steps of:

moving the carcasses toward a pair of disc cutters which straddle the processing path; and as the carcasses are moved along the processing path, performing the following steps:

directing the elbow joints between the drumette segments and the mid-wing segments into engagement with the rotary disc cutters; and severing the mid-wing segments from the drumette segments of the wings through the connecting tissue between the mid-wing segment and the drumette segment of each wing, wherein the step of directing the elbow joints comprises moving the shoulder joints between the wings and the carcasses onto a ramp having an inclined portion and a portion substantially parallel to the processing path so that the carcasses are tilted rearwardly away from their direction of movement and the shoulder joints are raised substantially to an approximate predetermined height with respect to the rotary disc cutters, and wherein the step of directing the elbow joints further comprises engaging each of the wings with wing guide means for pivoting the wings downwardly and rearwardly away from the direction of movement of the carcasses.

16. The method of claim 15 and wherein the step of directing the elbow joints further comprises engaging each of the mid-wing segments of the carcasses with mid-wing guide means for extending the mid-wing segments laterally outwardly away from the carcass to the outward sides of the rotary disc cutters.

17. The method of claim 15 and wherein the step of directing the elbow joints further comprises engaging the drumette segments with guide plates on the inward sides of the drumette segments as the mid-wing segments are severed from the drumette segments.

18. The method of claim 15 and wherein the step of directing the elbow joints further comprises engaging the torsos of the carcasses with a pair of torso engaging guide rods, which straddle the path of movement of the carcasses and which, for an initial portion of their length, converge toward the processing path.

19. The method of claim 15 and wherein the step of severing the mid-wing segments from the drumette segments of the wings comprises pressing the elbow joints, as the elbow joints contact the peripheral edges of the rotary disc cutters, downwardly toward the rotary disc cutters until the rotary disc cutters have cut through the elbow joints and severed the mid-wing segments from the drumette segments.

* * * * *